United States Patent
Tsumura

(10) Patent No.: US 11,333,736 B2
(45) Date of Patent: May 17, 2022

(54) POSITION MEASUREMENT DEVICE AND METHOD, AND RECORDING MEDIUM

(71) Applicant: NEC CORPORATION, Tokyo (JP)

(72) Inventor: Shusuke Tsumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 41 days.

(21) Appl. No.: 16/766,067

(22) PCT Filed: Dec. 18, 2018

(86) PCT No.: PCT/JP2018/046450
§ 371 (c)(1),
(2) Date: May 21, 2020

(87) PCT Pub. No.: WO2019/131299
PCT Pub. Date: Jul. 4, 2019

(65) Prior Publication Data
US 2020/0348420 A1 Nov. 5, 2020

(30) Foreign Application Priority Data
Dec. 25, 2017 (JP) .............................. JP2017-248193

(51) Int. Cl.
*G01S 3/02* (2006.01)
*G01S 5/02* (2010.01)

(52) U.S. Cl.
CPC .......... *G01S 5/0244* (2020.05); *G01S 5/0249* (2020.05); *G01S 5/0263* (2013.01); *G01S 5/0289* (2013.01); *G01S 5/0295* (2020.05)

(58) Field of Classification Search
CPC .... G01S 5/0244; G01S 5/0249; G01S 5/0295; G01S 5/0263; G01S 5/0289
(Continued)

(56) References Cited

U.S. PATENT DOCUMENTS 6,694,142 B1 * 2/2004 Kuwahara ............. H04W 64/00
455/456.1
6,853,847 B2 * 2/2005 Shioda .................... G01S 5/021
342/126
(Continued)

FOREIGN PATENT DOCUMENTS

JP 2003-299140 A 10/2003
JP 2010-112869 A 5/2010
(Continued)

OTHER PUBLICATIONS

International Search Report for PCT/JP2018/046450 dated Mar. 12, 2019 [PCT/ISA/210].
(Continued)

*Primary Examiner* — Chuong P Nguyen
(74) *Attorney, Agent, or Firm* — Sughrue Mion, PLLC

(57) ABSTRACT

In the present invention, to make it possible to enhance the accuracy of positioning in an area not reached by a GNSS signal: a first position of a host device is estimated; the error of the first position is estimated; from a second device, other device information is received that includes a second position of the second device and a second error of the second position that have been estimated by the second device; and if the second error is smaller than the first error, the first position and first error are corrected on the basis of the other device information.

20 Claims, 11 Drawing Sheets

(58) Field of Classification Search
USPC .................................... 342/357.3, 450, 451
See application file for complete search history.

(56) References Cited

U.S. PATENT DOCUMENTS

| | | | | |
|---|---|---|---|---|
| 7,203,501 B2* | 4/2007 | Kim | ...................... | G01S 5/0252 |
| | | | | 455/456.1 |
| 8,369,872 B2* | 2/2013 | Gessner | ................ | G01S 5/0263 |
| | | | | 455/456.2 |
| 9,903,953 B2* | 2/2018 | McClure | .............. | G01S 19/071 |
| 9,913,093 B2* | 3/2018 | Hwang | ................ | H04W 4/023 |
| 10,123,295 B2* | 11/2018 | Pon | ...................... | H04W 64/00 |
| 10,254,379 B2* | 4/2019 | Sendonaris | ............. | G01S 19/31 |
| 2017/0150314 A1* | 5/2017 | Hwang | ..................... | G01S 5/00 |
| 2017/0238136 A1* | 8/2017 | Smith | ............... | H04M 1/72421 |
| | | | | 455/456.3 |
| 2019/0025060 A1* | 1/2019 | Corum | ..................... | G01S 1/08 |

FOREIGN PATENT DOCUMENTS

| | | | |
|---|---|---|---|
| JP | 2011-139503 A | 7/2011 |
| JP | 2012-211843 A | 11/2012 |
| JP | 2016-020812 A | 2/2016 |
| JP | 2016-133316 A | 7/2016 |
| JP | 2017-111103 A | 6/2017 |

OTHER PUBLICATIONS

Written Opinion for PCT/JP2018/046450 dated Mar. 12, 2019 [PCT/ISA/237].

* cited by examiner

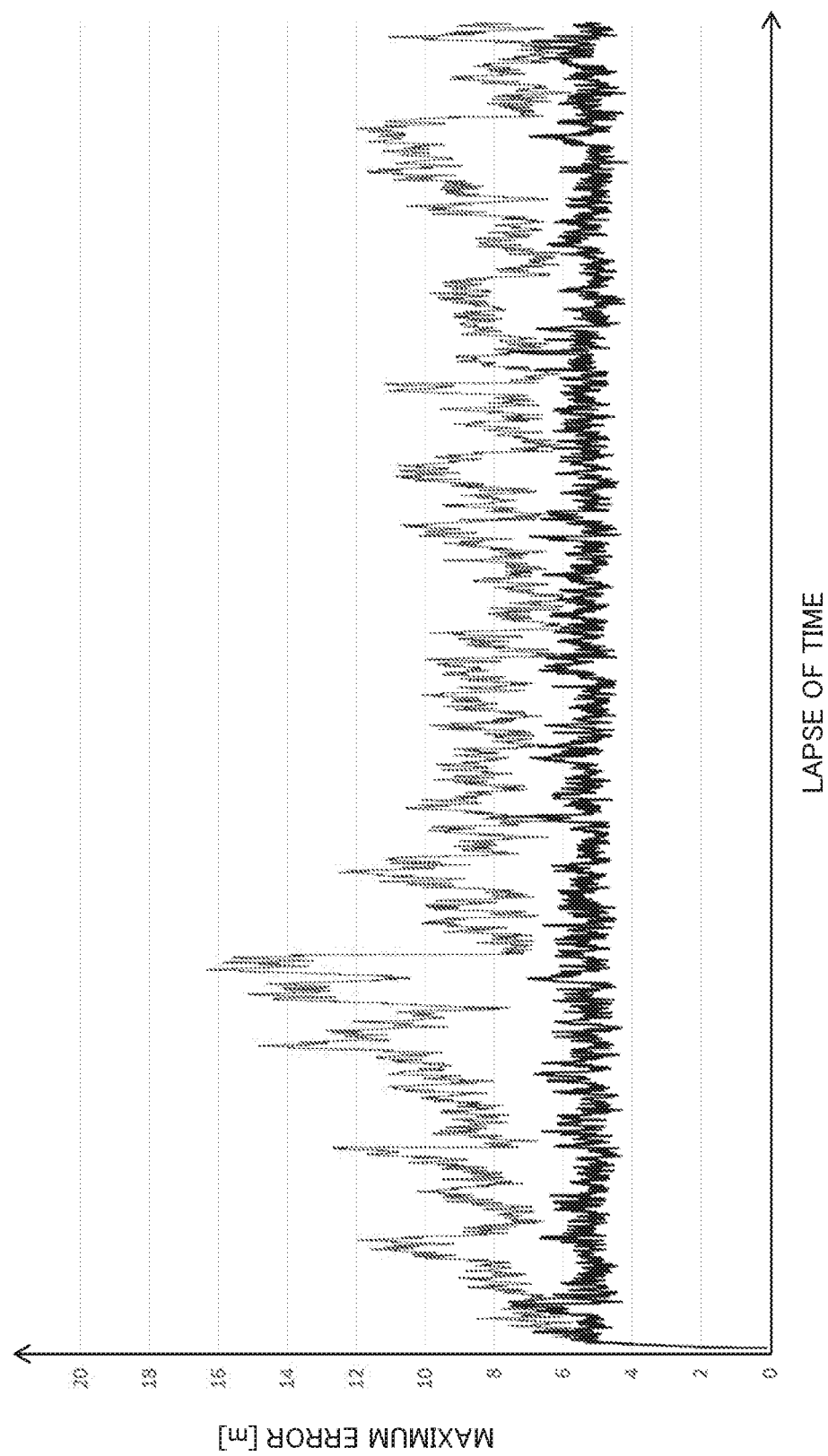

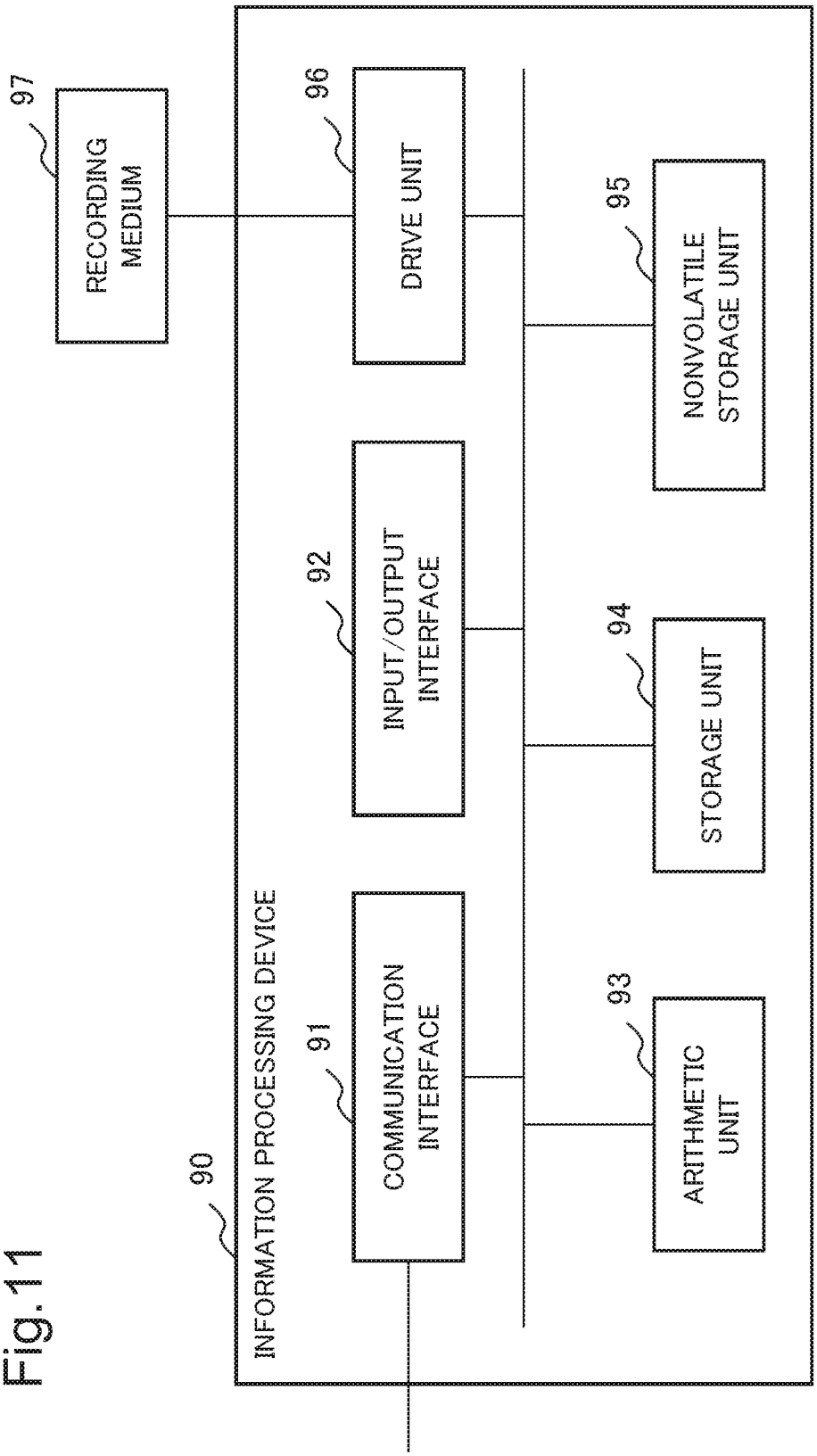

POSITION MEASUREMENT DEVICE AND METHOD, AND RECORDING MEDIUM

CROSS REFERENCE TO RELATED APPLICATIONS

This application is a National Stage of International Application No. PCT/JP2018/046450 filed Dec. 18, 2018, claiming priority based on Japanese Patent Application No. 2017-248193 filed Dec. 25, 2017.

TECHNICAL FIELD

The present invention relates to a position measurement device and method, and a recording medium.

BACKGROUND ART

As one of methods of positioning a mobile terminal in an area (such as an indoor space) that is not reached by a global navigation satellite system (GNSS) signal, a beacon transmitter using a wireless local area network (LAN), Bluetooth (registered trademark), and the like is installed in the area. However, in this method, a preliminary survey for an installation state of wireless LAN access points and installation/management of the beacon transmitter are required. In view of this, a positioning method of pedestrian dead-reckoning (PDR) that does not require a preliminary survey or device installation has drawn attention.

The PDR is a method of acquiring a relative position from an initial position by, based on information acquired from an acceleration sensor, a gyro scope, an electronic compass, or the like mounted on a mobile terminal, calculating a traveling speed of the mobile terminal, estimating a traveling direction and a traveling distance, and integrating the results.

The information acquired from the sensor includes some errors caused by noise, deviation during calibration, a sampling cycle, and the like. Further, due to various causes such as a way of holding a terminal, a way of walking, a step, and a type of shoes of a user, and a structure of a building, an error of an estimated position varies. The PDR is a method of acquiring a relative position by integrating a traveling direction and a traveling distance that are estimated based on sensor information, and hence errors are integrated and increased along with the lapse of time even when an error of the sensor information or the estimated position is fine.

For the purpose of suppressing an increase of errors and improving positioning accuracy, for example, in a method described in PTL 1, an estimated error in each of positioning by the GNSS and positioning by the PDR is calculated, and positioning is performed by a positioning method with a smaller estimated error. However, this method is for improving positioning accuracy by using the GNSS, and thus positioning accuracy cannot be improved in an area that is not reached by a GNSS signal.

As a method of improving positioning accuracy in an area that is not reached by a GNSS signal, the following two methods are mainly provided.

In the first method, beacon transmitters are arranged close to one another. In this method, an initial position and an error can be reset at a shorter time interval by arranging the beacon transmitters close to one another, and hence positioning accuracy can be improved.

In the second method, map matching is used. In this method, it is assumed that a mobile terminal moves only on a predetermined route (such as a pathway), and when a positioning result is deviated from the route due to an increased error, a location on the route that is closest to the positioning result is determined as a final positioning result.

CITATION LIST

Patent Literature

[PTL 1] Japanese Unexamined Patent Application Publication No. 2017-111103

SUMMARY OF INVENTION

Technical Problem

However, in the method of arranging the beacon transmitters close to one another, costs for installing/managing a large number of beacon transmitters are required, and utilization of the PDR is meaningless. Further, when the installation number of beacon transmitters is reduced for the purpose of minimizing costs of the beacon transmitters, the number of chances that a mobile terminal approaches beacons is reduced, and thus an initial position and an error are not reset for a long time, depending on a traveling route. Further, facilities such as a large factory and a gymnastic hall do not have pillars, walls, and ceilings for installing the beacon transmitters, and hence installation of the beacon transmitters is difficult. In such facilities, installation of a sufficient number of beacon transmitters is difficult.

Further, in the method of using map matching, it is required to generate route data in advance, which is time-consuming. Further, it is required to deal with a route change due to a floor layout change or the like every time. Further, setting of a route is impossible in a large space that allows free movement in all directions, and hence this method cannot be used.

An object of the present invention is to provide a position measurement device and method, and a recording medium that enable improvement of positioning accuracy in an area that is not reached by a GNSS signal.

Solution to Problem

In order to solve the above-mentioned problem, a position measurement device according to the present invention includes: a positioning means for estimating a first position of an own device; an error estimation means for estimating a first error of the first position; a reception means for receiving, from a second device, other device information including a second position of the second device and a second error of the second position that are estimated by the second device; and a correction means for correcting the first position and the first error, based on the other device information, when the second error is smaller than the first error.

Further, a position measurement method according to the present invention includes: estimating a first position of an own device; estimating a first error of the first position; receiving, from a second device, other device information including a second position of the second device and a second error of the second position that are estimated by the second device; and correcting the first position and the first error, based on the other device information, when the second error is smaller than the first error.

Further, a computer-readable recording medium according to the present invention records a position measurement program causing a computer to execute: a positioning function of estimating a first position of an own device; an error estimation function of estimating a first error of the first position; a reception function of receiving, from a second device, other device information including a second position of the second device and a second error of the second position that are estimated by the second device; and a correction function of correcting the first position and the first error, based on the other device information, when the second error is smaller than the first error.

Advantageous Effects of Invention

With the position measurement device and method, and the recording medium according to the present invention, positioning accuracy can be improved in an area that is not reached by a GNSS signal.

BRIEF DESCRIPTION OF DRAWINGS

FIG. 10 shows results of the simulation using the position measurement device according to the second example embodiment of the present invention.

FIG. 11 shows a hardware configuration example of each example embodiment of the present invention.

EXAMPLE EMBODIMENT

First Example Embodiment

A first example embodiment of the present invention is described.

Figure 1:
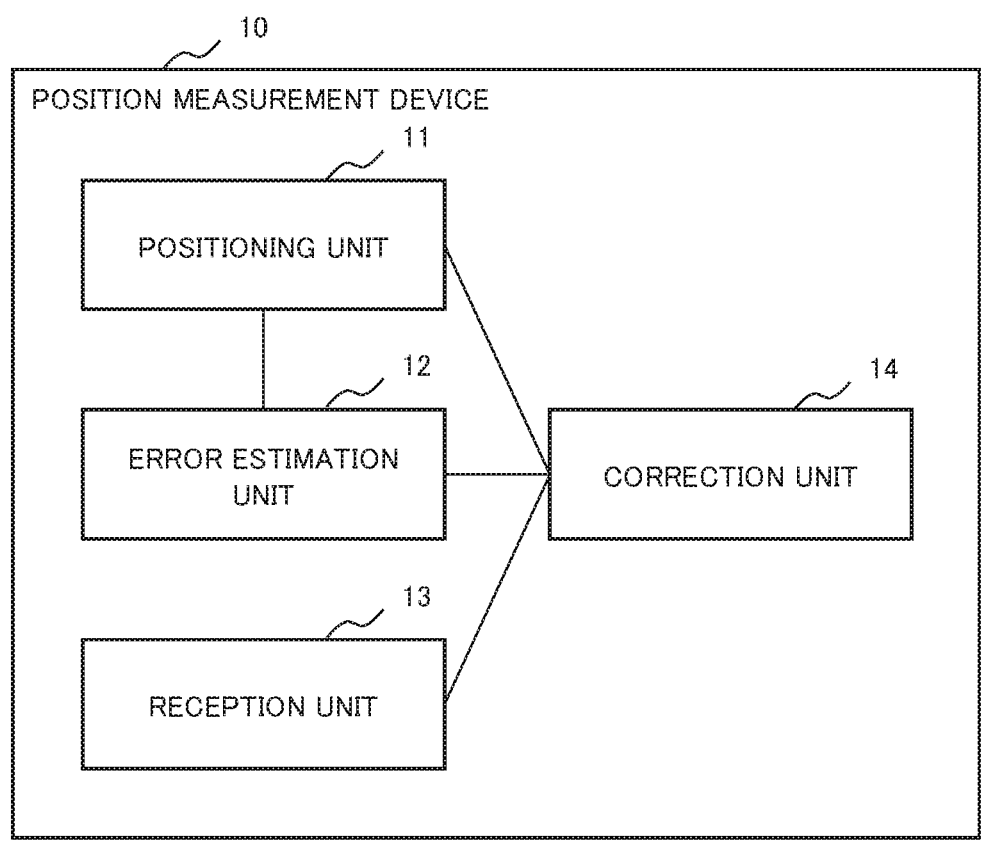
FIG. 1 shows a configuration example of a position measurement device according to a first example embodiment of the present invention.

FIG. 1 shows a configuration example of a position measurement device 10 according to the present example embodiment. The position measurement device 10 according to the present example embodiment includes a positioning unit 11, an error estimation unit 12, a reception unit 13, and a correction unit 14.

The positioning unit 11 is a unit that estimates a first position of an own device. The error estimation unit 12 is a unit that estimates a first error of the first position. The reception unit 13 is a unit that receives, from a second device, other device information including a second position of the second device and a second error of the second position that are estimated by the second device. The correction unit 14 is a unit that corrects the first position and the first error, based on the other device information when the second error is smaller than the first error.

With the position measurement device 10 configured as described above, the position measurement device 10 receives, from the second device, the other device information including the second position of the second device and the second error of the second position that are estimated by the second device. Further, when the second error is smaller than the first error, the first position and the first error are corrected based on the other device information. With this, the position measurement device 10 is capable of correcting the position of the own device, based on a positioning result of the other device with a smaller error. Thus, positioning accuracy can be improved in an area that is not reached by a GNSS signal.

Figure 2:
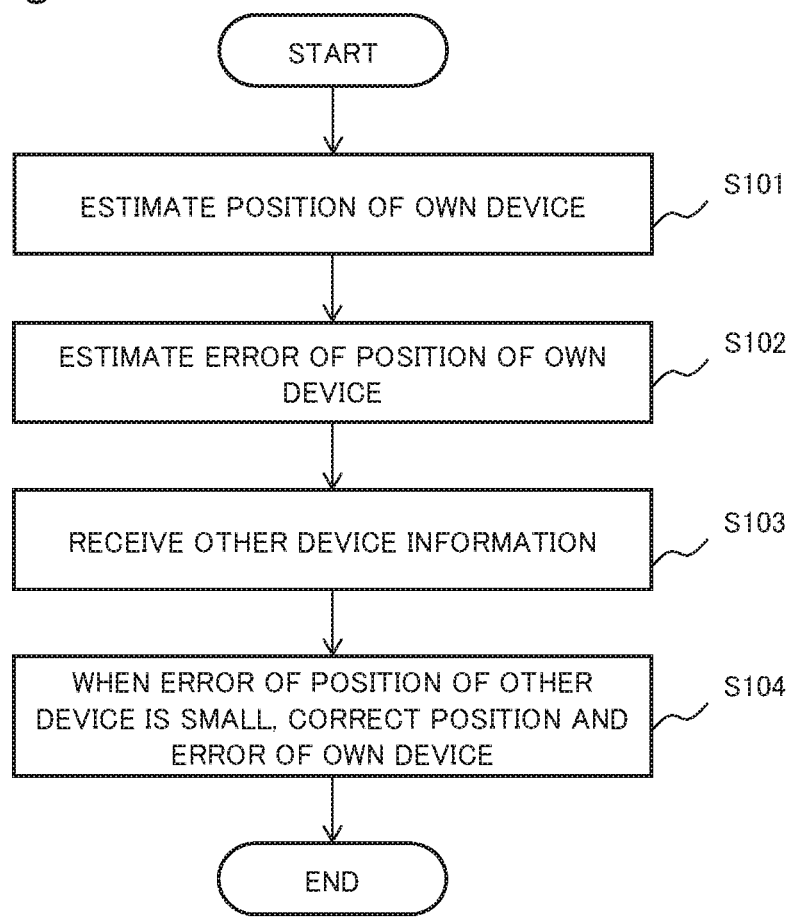
FIG. 2 shows an operation example of the position measurement device according to the first example embodiment of the present invention.

Next, FIG. 2 shows an example of an operation of the position measurement device 10 according to the present example embodiment.

The positioning unit 11 estimates a first position of an own device (Step S101). The error estimation unit 12 estimates a first error of the first position (Step S102). The reception unit 13 receives, from a second device, other device information including a second position of the second device and a second error of the second position that are estimated by the second device (Step S103). The correction unit 14 corrects the first position and the first error, based on the other device information when the second error is smaller than the first error (Step S104).

With this operation, the position measurement device 10 receives, from the second device, the other device information including the second position of the second device and the second error of the second position that are estimated by the second device. Further, when the second error is smaller than the first error, the first position and the first error are corrected based on the other device information. With this, the position measurement device 10 is capable of correcting the position of the own device, based on the positioning result of the other device with a smaller error. Thus, positioning accuracy can be improved in an area that is not reached by a GNSS signal.

As described above, in the first example embodiment of the present invention, the position measurement device 10 receives, from the second device, the other device information including the second position of the second device and the second error of the second position that are estimated by the second device. Further, when the second error is smaller than the first error, the first position and the first error are corrected based on the other device information. With this, the position measurement device 10 is capable of correcting the position of the own device, based on the positioning result of the other device with a smaller error. Thus, positioning accuracy can be improved in an area that is not reached by a GNSS signal.

Second Example Embodiment

Next, a second example embodiment of the present invention is described. In the present example embodiment, detailed description is further made on a position measurement device.

Figure 3:
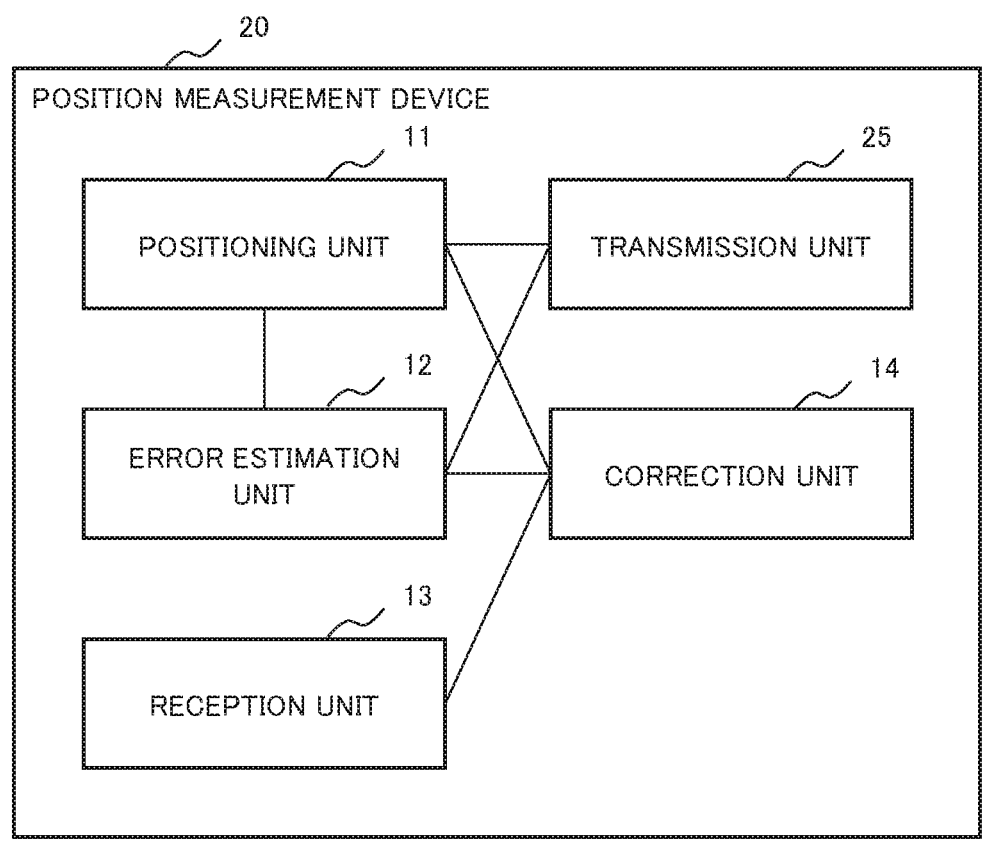
FIG. 3 shows a configuration example of a position measurement device according to a second example embodiment of the present invention.

First, FIG. 3 shows a configuration example of a position measurement device 20 according to the present example embodiment. The position measurement device 20 according to the present example embodiment has a configuration acquired by adding a transmission unit 25 to the position measurement device 10 (FIG. 1) according to the first example embodiment.

A positioning unit 11 is a unit that estimates a position (first position) of the own device (position measurement device 20). It is assumed that the positioning unit 11 estimates and holds the first position on a regular basis. In the present example embodiment, the positioning unit 11 performs positioning through use of the PDR, but positioning may be performed by other positioning methods capable of estimating a positioning error.

An error estimation unit 12 is a unit that estimates an error (a first error) of the position (first position) of the own device estimated by the positioning unit 11. It is assumed that the error estimation unit 12 estimates and holds the first error every time the first position is updated. The method of estimating an error is described later.

The transmission unit 25 is a unit that transmits own device information including the first position and the first error. The transmission unit 25 broadcasts the own device information on a regular basis with a wireless signal such as Bluetooth and Bluetooth Low Energy (BLE). The transmission unit 25 is also capable of transmitting the own device information via a wireless LAN, ZigBee (registered trademark), visible light communication, infrared communication such as IrDA (registered trademark), ultrasonic communication, and the like.

The transmission unit 25 transmits the own device information with transmission power that causes a range capable of receiving the own device information to fall within a predetermined transmission range. When the transmission range is excessively broad, an error at the time of correcting the first position is excessively large. Thus, it is desired that the transmission range be set as appropriate according to a size of a facility in which position measurement devices 20 are used or density of the position measurement devices 20 in the facility. For example, the position measurement device 20 transmits the own device information with transmission power that allows another position measurement device 20 capable of receiving the own device information to be another position measurement device 20 present within a radius of 1 to 2 m from the own device.

In the present example embodiment, it is assumed that the own device information includes information relating to the transmission range of the own device information, more specifically, information relating to a radius of the transmission range (a transmission distance).

Note that, when the first error exceeds a predetermined threshold value, the transmission unit 25 may stop transmission of the own device information, and when the first error is equal to or less than the predetermined threshold value, transmission of the own device information may be started again. When an error of the position of the own device is larger than a certain degree, a possibility that another device that performs correction of a position through use of the own device information is present becomes low. Thus, transmission of the own device information is stopped when the first error exceeds the predetermined threshold value, and thus power consumption can be suppressed when the possibility that another device that performs correction of a position through use of the own device information is present is low.

A reception unit 13 is a unit that receives, from another position measurement device 20 (a second device), other device information including a position (second position) of the second device and an error (a second error) of the second position that are estimated by the second device. In the present example embodiment, it is assumed that the other device information further includes information relating to a transmission distance of the second device.

A correction unit 14 is a unit that corrects the first position and the first error, based on the other device information.

Between the own device and the second device being a transmission source of the other device information, the maximum distance is the transmission distance of the second device. Thus, when an estimated position of the own device is corrected to an estimated position (a second position) of the second device, the error of the own device after correction is a value larger than the error (second error) of the second position by the transmission distance of the second device at most.

Thus, in the present example embodiment, first, the correction unit 14 calculates the first error after correction (a third error) acquired by adding the transmission distance of the second device to the second error, and performing correction. Next, the correction unit 14 compares the third error with the first error before correction. Then, when the third error is smaller than the first error before correction, the correction unit 14 corrects the first position held by the positioning unit 11 to the second position included in the other device information, and corrects the first error held by the error estimation unit 12 to the third error.

Note that, the correction unit 14 may calculate the third error when the second error is smaller than the first error. Further, the correction unit 14 may calculate the third error when a value acquired by subtracting the second error from the first error is larger than the transmission distance of the second device. In this case, the third error is smaller than the first error, and hence the correction unit 14 corrects the first position and the first error without comparing the first error with the third error.

When other device information can be received from a plurality of other position measurement devices 20, the correction unit 14 may correct the position and the error of the own device in the following manner.

Figure 4:
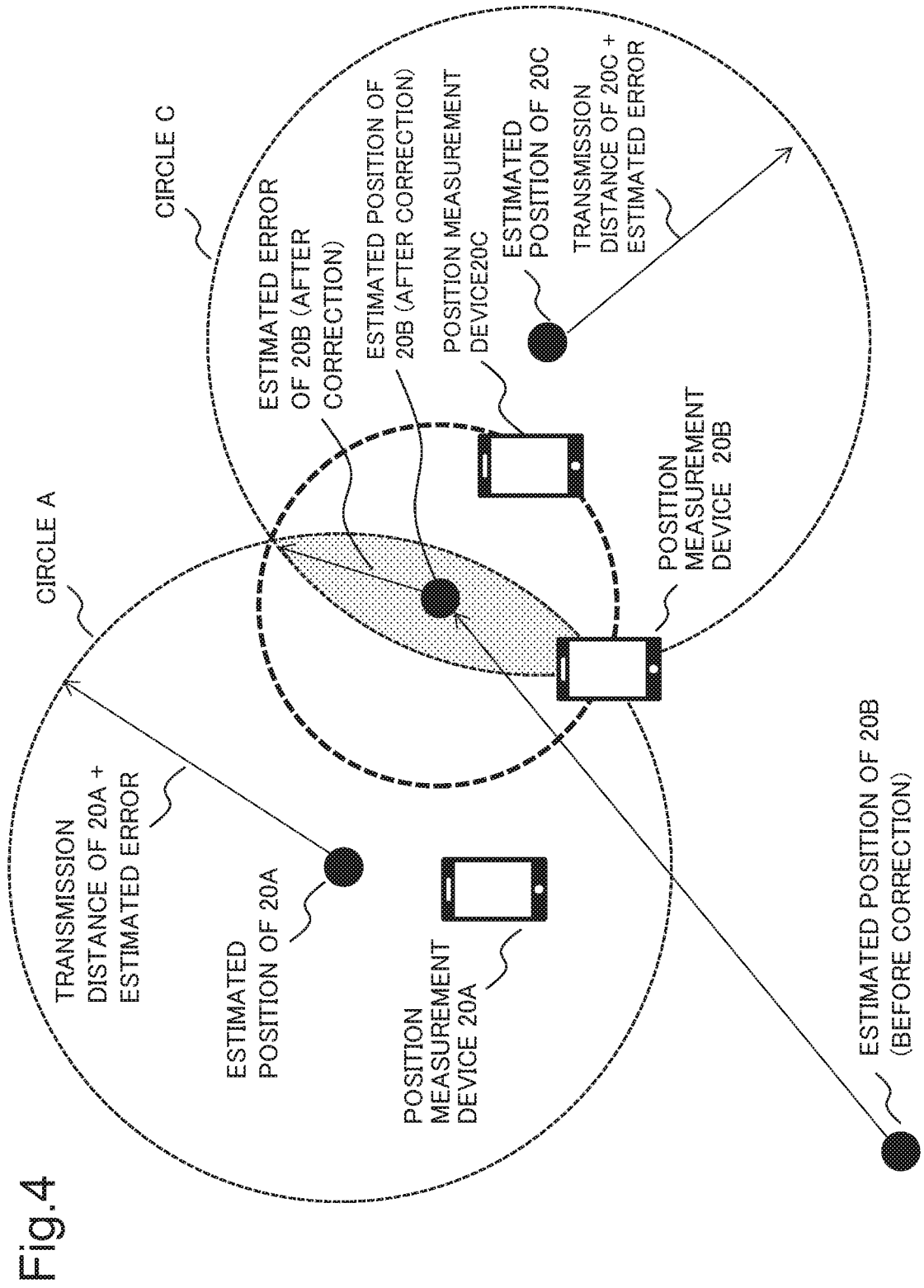
FIG. 4 shows an example of a method of correcting positional information relating to the position measurement device according to the second example embodiment of the present invention.

FIG. 4 shows an image diagram in a case where a position measurement device 20B receives other device information relating to a position measurement device 20A and other device information relating to a position measurement device 20C. In this case, the position measurement device 20B can receive the other device information from the position measurement device 20A, and hence is highly possible to be present in a circle (circle A) having an estimated position of the position measurement device 20A as a center and a sum of a transmission distance and an estimated error of the position measurement device 20A as a radius. Further, in a similar manner, the position measurement device 20B can receive the other device information from the position measurement device 20C, and hence is highly possible to be present in a circle (circle C) having an estimated position of the position measurement device 20C as a center and a sum of a transmission distance and an estimated error of the position measurement device 20C as a radius. Further, the position measurement device 20B can receive the other device information from the position measurement device 20A and the position measurement device 20C, and hence is highly possible to be present in a region included both in the circle A and the circle C.

Thus, the correction unit 14 draws a circle having a second position as a center and a sum of a second error and a transmission distance as a radius for each of a plurality of pieces of other device information that can be received, and acquires a region included in all the circles. Next, the correction unit 14 sets a radius of a circle having the smallest radius (hereinafter, referred to as the smallest enclosing circle) among circles including the region, as an error (a third error) of the position of the own device after correction in a case where correction is performed, and compares the third error with the error (first error) of the own device before correction. Further, when the third error is smaller than the first error, the correction unit 14 corrects the first position to the center of the smallest enclosing circle, and corrects the first error to the third error.

Next, the method of estimating an error is described. Note that, error estimation methods described below are examples, and other methods may be used.

Roughly, the method of estimating an error includes two types that are one based on an estimated travel amount and the other one based on a lapse of time.

First, the method based on an estimated travel amount is described.

When receiving a reference signal of a beacon transmitter or the like, the positioning unit 11 resets the first position to a position indicated by the reference signal. Further, at this state, the error estimation unit 12 resets the first error to 0.

A time point at which the first position and the first error are reset previously is indicated with $t_0$, a positioning time point thereafter with the PDR is indicated with $t_i$ ($i=1, 2, 3, \ldots$), and an estimated travel amount of the position measurement device 20 between the time point $t_i$ and the time point $t_{i-1}$, which is estimated by the positioning unit 11, is indicated with $d_i$. In this case, the error estimation unit 12 is capable of calculating a total estimated travel amount d from the time point $t_0$ to a time point $t_n$ with Equation 1.

$$d = \Sigma_{i-1}^{n} d_1 \quad \text{(Equation 1)}$$

$$e = k_1 \times d \quad \text{(Equation 2)}$$

Further, as in Equation 2, the error estimation unit 12 is capable of regarding a product of the total estimated travel amount d and a predetermined coefficient $k_1$ as an estimated error e at the time point $t_n$.

Next, the method based on a lapse of time is described.

In this case, for example, as in Equation 3, the error estimation unit 12 is capable of regarding a product of a lapse of time from the time point $t_0$ to the time point $t_n$ and a predetermined coefficient $k_2$ as an estimated error e at the time point $t_n$.

$$e = k_2 \times (t_n - t_0) \quad \text{(Equation 3)}$$

Note that, the coefficient $k_1$ and the coefficient $k_2$ described above are values that are statistically acquired from a trend of an error of a sensor or the like and are set with respect to the position measurement device 20 in advance.

$$k_1 = D/d \quad \text{(Equation 4)}$$

$$k_2 = D/(t_n - t_0) \quad \text{(Equation 5)}$$

Alternatively, as in Equation 4 or Equation 5, when the first error is reset, the error estimation unit 12 may calculate the coefficient $k_1$ or the coefficient $k_2$ dynamically, based on a difference D between the first positions after and before the reset.

Figure 5:
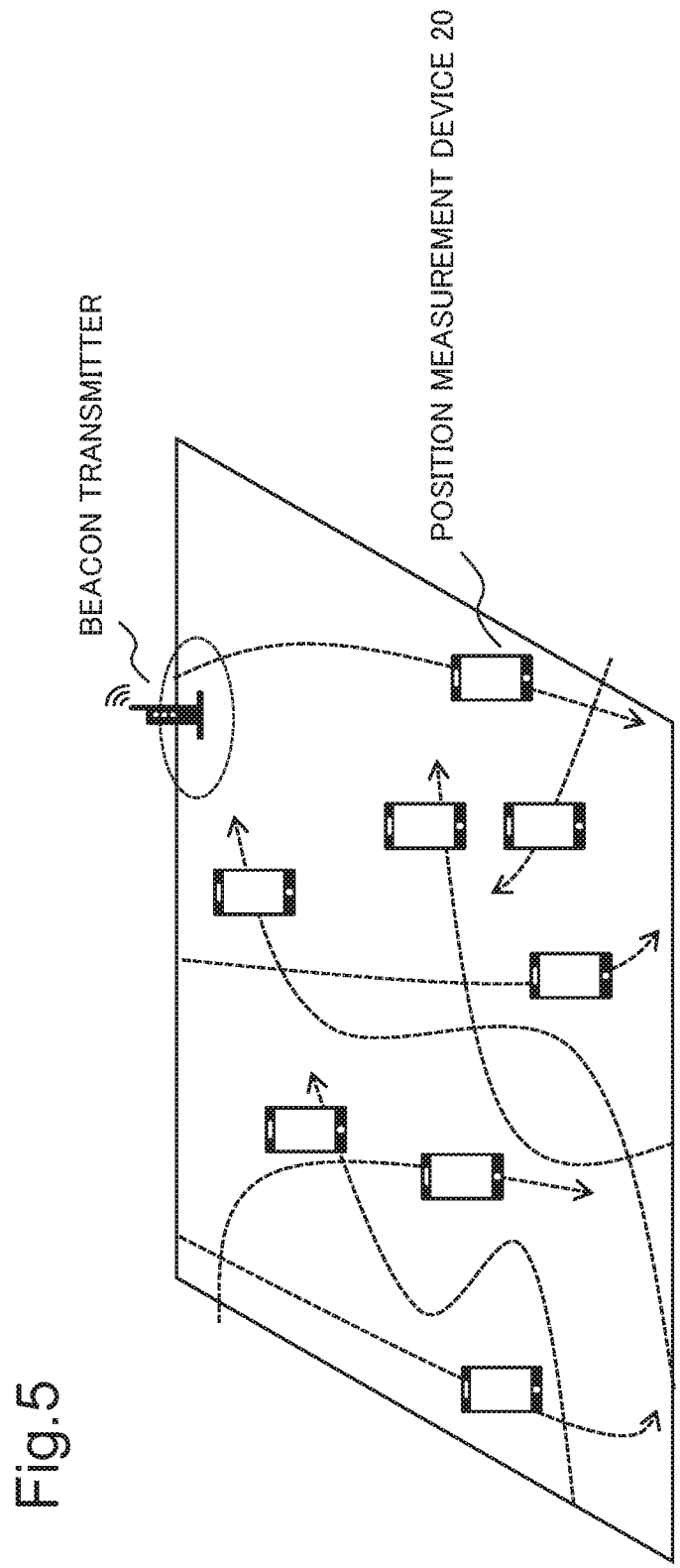
FIG. 5 shows an example of a use scene of the position measurement device according to the second example embodiment of the present invention.
Figure 6:
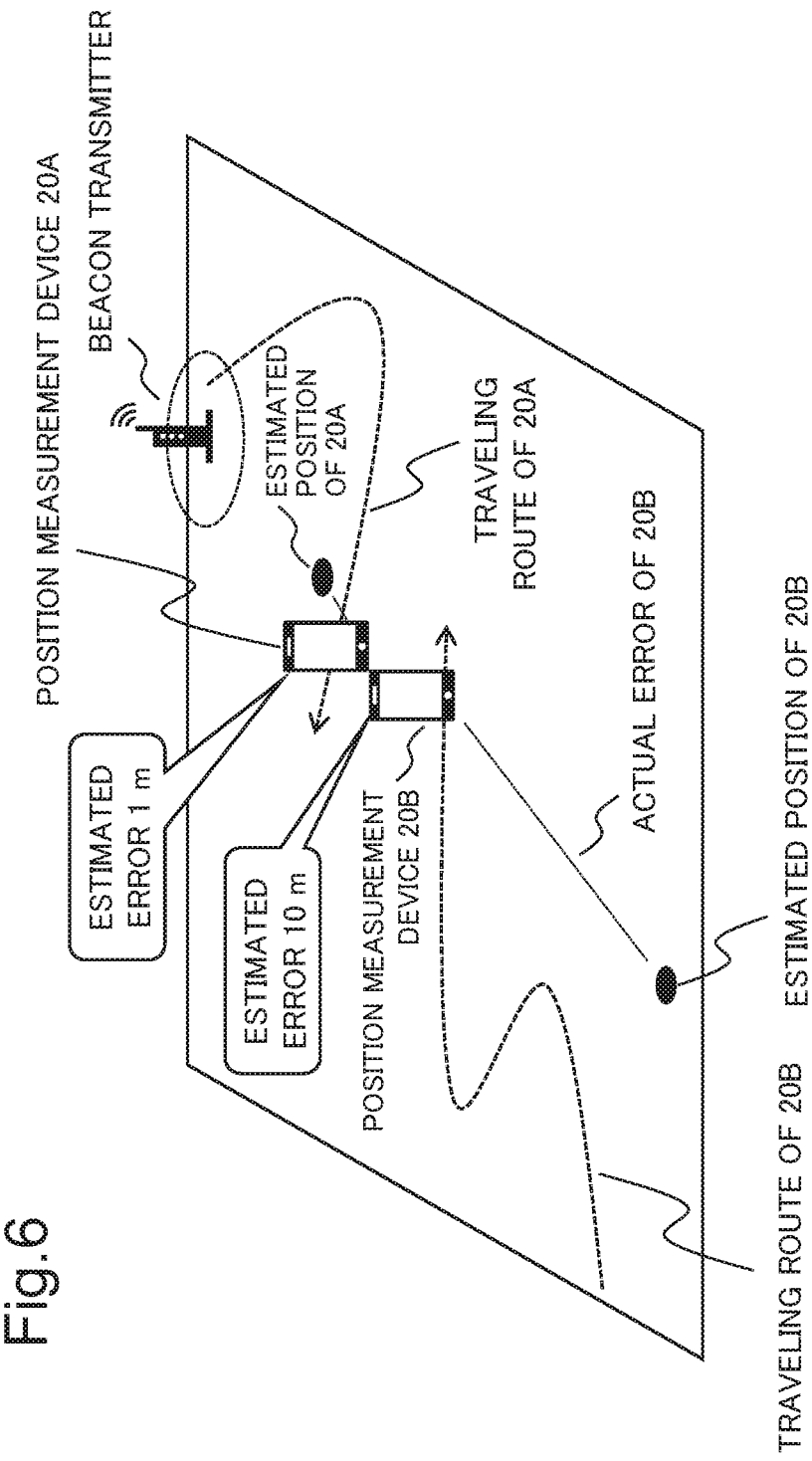
FIG. 6 shows an example of a use scene of the position measurement device according to the second example embodiment of the present invention.
Figure 7:
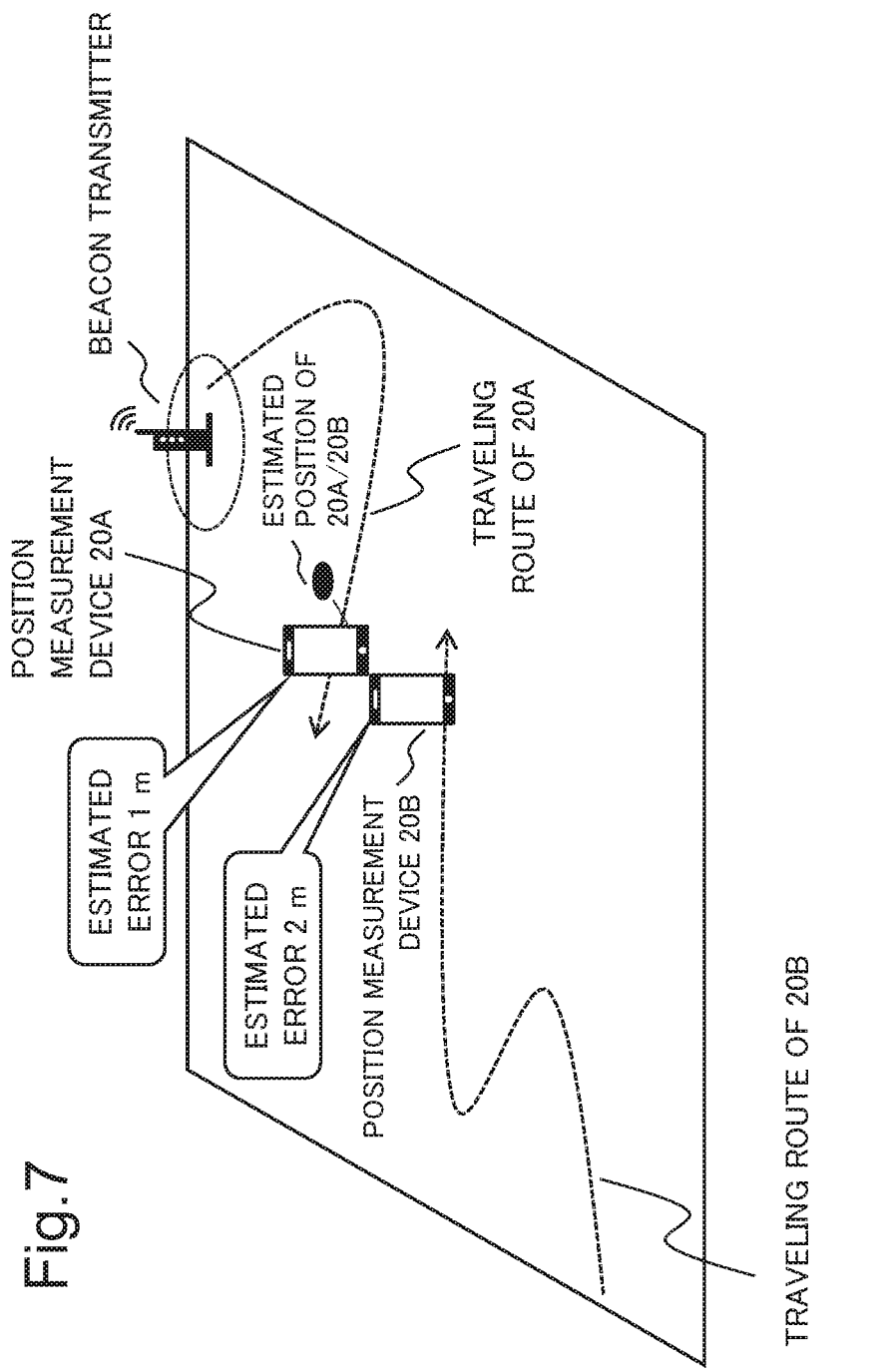
FIG. 7 shows an example of a use scene of the position measurement device according to the second example embodiment of the present invention.

FIGS. 5 to 7 show image diagrams of use scenes of the position measurement device 20 according to the present example embodiment.

It is assumed that, as shown in FIG. 5, a number of position measurement devices 20 are present in a positioning area. FIG. 6 shows an example in which the position measurement device 20A with a short lapse of time after performing correction with a beacon signal and the position measurement device 20B with a long lapse of time pass by each other.

The position measurement device 20A has an estimated error smaller than that of the position measurement device 20B because the lapse of time after performing correction with the beacon signal is short. For example, it is assumed that the estimated error of the position measurement device 20A is 1 m, that an estimated error of the position measurement device 20B is 10 m, and that a transmission distance of the position measurement device 20A and the position measurement device 20B is 1 m. In this case, the sum (11 m) of the estimated error and a transmission distance of the position measurement device 20B is larger than the estimated error (1 m) of the position measurement device 20A, and hence the position measurement device 20A does not correct positional information relating to the own device. Meanwhile, the sum (2 m) of the estimated error and the transmission distance of the position measurement device 20A is smaller than the estimated error (10 m) of the position measurement device 20B, and hence the position measurement device 20B corrects the estimated position of the own device to the estimated position of the position measurement device 20A. Further, the position measurement device 20B corrects the estimated error of the own device to the sum (2 m) of the estimated error and the transmission distance of the position measurement device 20A. As a result, as in FIG. 7, the estimated error of the position measurement device 20B is reduced from 10 m to 2 m, and positioning accuracy of the position measurement device 20B can be improved.

Note that, the position measurement device 20 according to the present example embodiment can also be used as a fixed terminal like a beacon transmitter. For example, the position measurement device 20A being a fixed terminal may transmit own device information, and the position measurement device 20B being a mobile terminal may correct positional information relating to the own device, based on other device information (own device information for the position measurement device 20A) received from the position measurement device 20A. The position measurement device 20A being a fixed terminal may correct the positional information relating to the own device, based on other device information received from the position measurement device 20B being a mobile terminal. When a position of the position measurement device 20 being a fixed terminal is accurate, it is assumed that an error of the position measurement device 20 is 0. The position measurement device 20 being a fixed terminal does not move, and hence an estimated error is not increased according to a lapse of time or a travel amount.

With the position measurement device 20 configured as described above, the position measurement device 20 receives, from the second device, the other device information including the second position of the second device and the second error of the second position that are estimated by the second device. Further, when the second error is smaller than the first error, the first position and the first error are corrected based on the other device information. With this, the position measurement device 20 is capable of correcting the position of the own device, based on the positioning result of the other device with a smaller error. Thus, positioning accuracy can be improved in an area that is not reached by a GNSS signal.

Further, in the present example embodiment, the other device information and the own device information include information relating to a transmission distance. Thus, the position measurement device 20 is capable of correcting the position of the own device more accurately in consideration of the transmission distance in the other device information.

Figure 8:
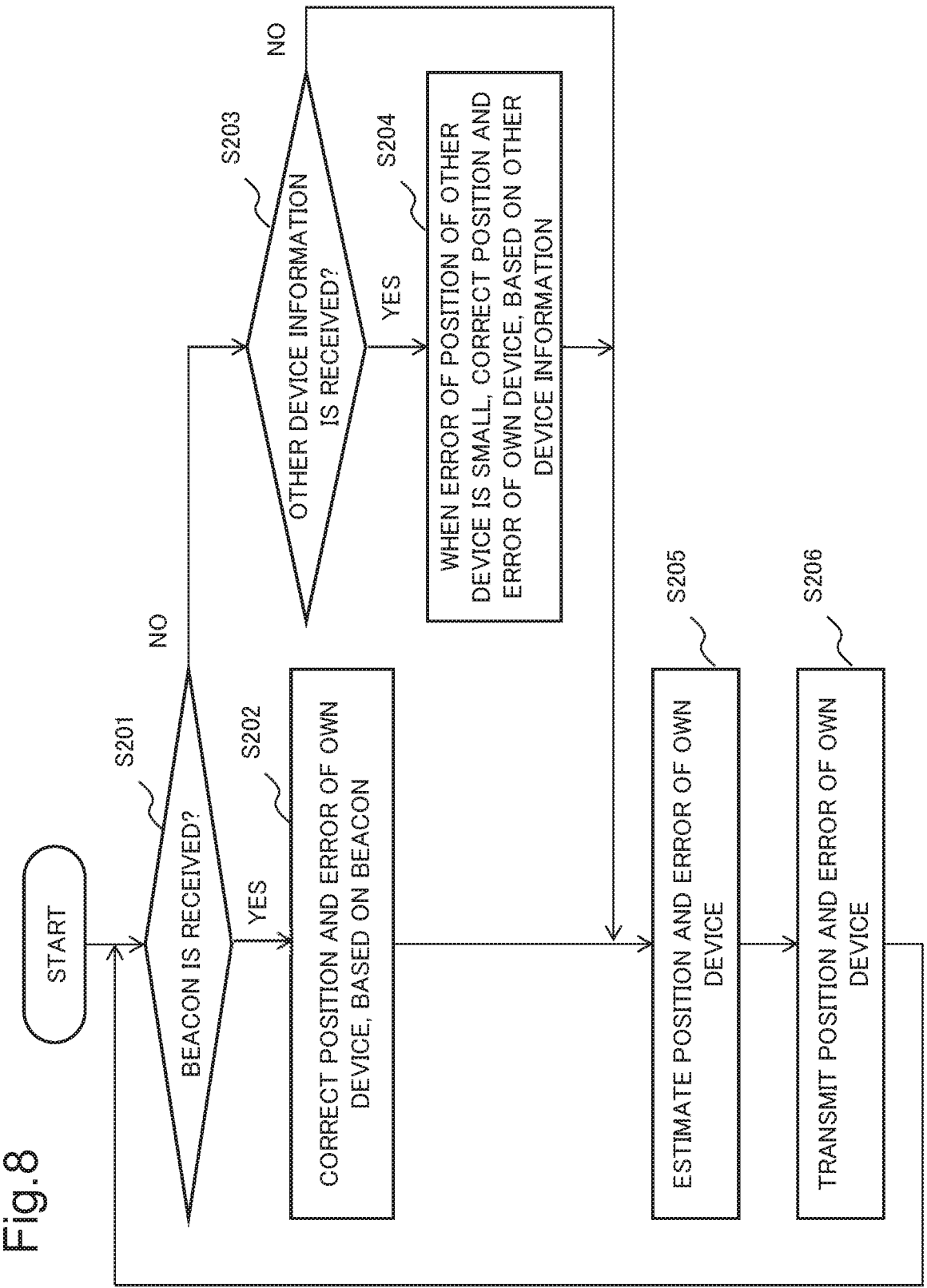
FIG. 8 shows an operation example of the position measurement device according to the second example embodiment of the present invention.

Next, by using FIG. 8, an operation example of the position measurement device 20 according to the present example embodiment is described.

Here, as an example, description is made on a case where a navigation application installed in the position measurement device 20 performs navigation in a shopping mall, based on positioning information of the position measurement device 20.

The shopping mall is an area in which installation of a large number of beacon transmitters is difficult due to wide pathways and a wellhole structure. In view of this, the position measurement device 20 held by a shopper performs positioning with the PDR, and the navigation application installed in the position measurement device 20 navigates the shopper to a target shop, based on the positioning information by the PDR. It is assumed that a small number of beacon transmitters are installed at gates of the shopping mall or the like.

At the time of entering the shopping mall, the position measurement device 20 receives, from a beacon transmitter installed at a gate, a beacon signal containing positional information relating to the gate (YES in Step S201). The position measurement device 20 corrects a position of the own device to a position indicated by the positional information contained in the beacon signal, and corrects an error of the position of the own device to an initial value (for example, 0) (Step S202). Then, positioning with the PDR is started.

While executing positioning with the PDR, the position measurement device 20 estimates a position (first position) and an error (first error) of the own device on a regular basis (Step S205). Further, the position measurement device 20 transmits the own device information including the first position and the first error (Step S206).

When receiving other device information from another position measurement device 20 (second device) (YES in Step S203), the position measurement device 20 compares an error (second error) of the position of the other device with the error (first error) of the position of the own device. Then, when the second error is smaller than the first error, the position measurement device 20 corrects the first position and the first error, based on the other device information (Step S204). The correction method is as described above.

When the way to the target shop is not clear, the shopper activates the navigation application installed in the position measurement device 20 and instructs the application to search a route to the target shop. The navigation application searches a route to the target shop, based on the positioning result (first position) by the PDR, and displays the resultant on a screen of the position measurement device 20.

When the position measurement device 20 is outside of the shopping mall and positioning with the GNSS is enabled, execution of the PDR is terminated.

With this operation, the position measurement device 20 receives, from the second device, the other device information including the second position of the second device and the second error of the second position that are estimated by the second device. Further, when the second error is smaller than the first error, the first position and the first error are corrected based on the other device information. With this, the position measurement device 20 is capable of correcting the position of the own device, based on the positioning result of the other device with a smaller error. Thus, positioning accuracy can be improved in an area that is not reached by a GNSS signal.

Next, theoretical simulation results with regard to the position measurement device 20 according to the present example embodiment are described.

This simulation includes two simulation patterns where the position measurement device 20 corrects positional information only by using a beacon signal of a beacon transmitter and where the position measurement device 20 corrects positional information by using a beacon signal and other device information.

Figure 9:
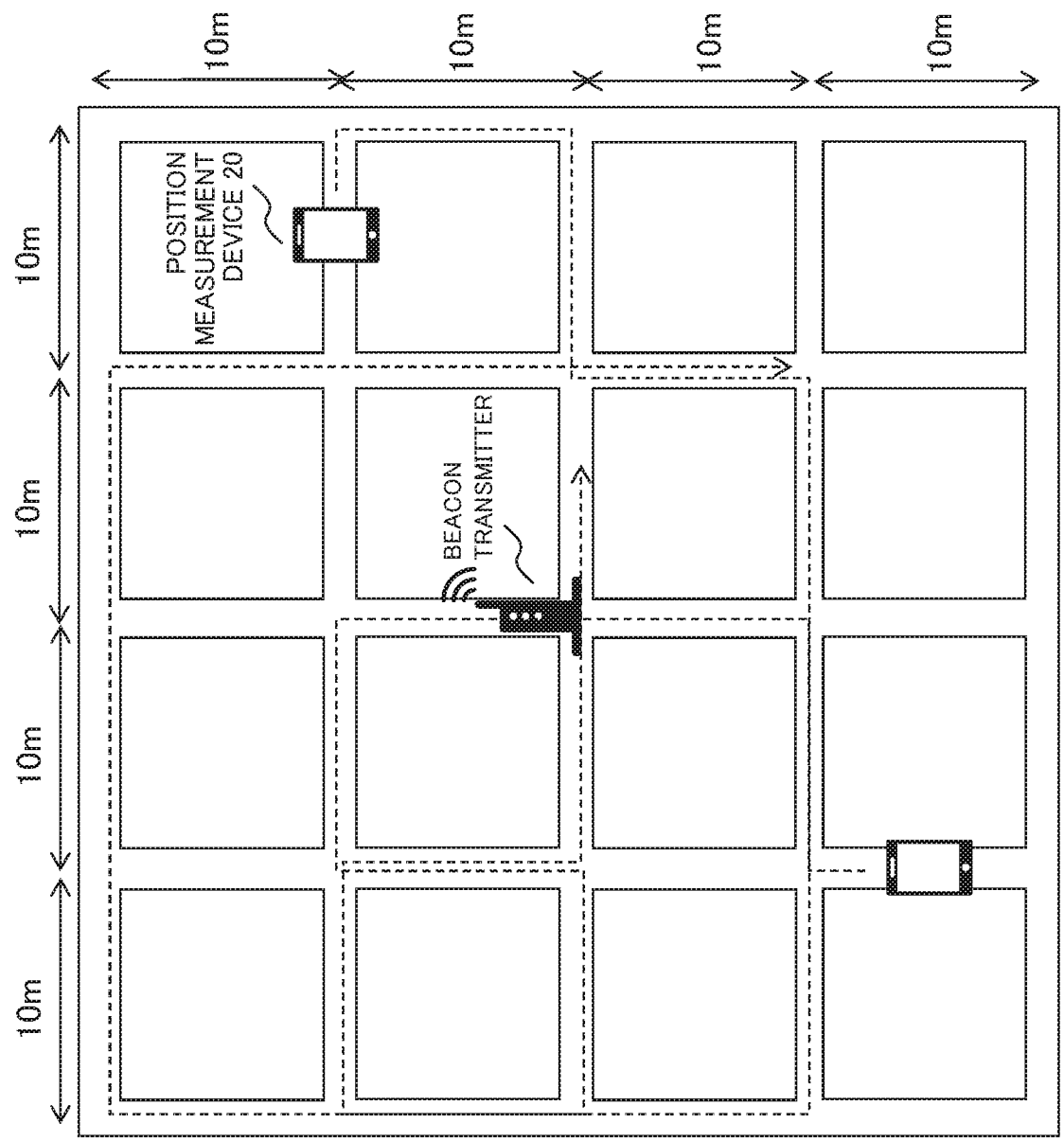
FIG. 9 shows a condition given for a simulation using the position measurement device according to the second example embodiment of the present invention.

FIG. 9 shows a positioning area assumed in this simulation. The area is a square with a side of 40 m, and has pathways at an interval of 10 m in a vertical direction and a horizontal direction. The total length of the pathways is (five vertical pathways+five horizontal pathways)×40 m=400 m.

In this simulation, three hundred position measurement devices 20 according to the present example embodiment are arranged randomly in the positioning area. Further, the position measurement device 20 randomly moves on the pathways at a speed from 1.2 m/s to 1.5 m/s. It is assumed that a transmission distance of own device information of the position measurement device 20 is 1 m, and a transmission interval is 200 ms. Further, a directional error of the position measurement device 20 during positioning with the PDR is set to randomly fall within a range from −10 degrees to +20 degrees, and a speed error is set to randomly fall within a range from 90% to 115%. Further, it is assumed that an estimated error of the position measurement device 20 is increased by 15 cm/s along with a lapse of time.

The beacon transmitter is arranged at the center of the positioning area. It is assumed that a transmission distance of a beacon signal of the beacon transmitter is 1 m, and a transmission interval is 200 ms.

In this simulation, maximum values of actual errors between estimated positions and actual positions when the position measurement devices 20 have moved continuously for three hours are measured under the conditions described above.

FIG. 10 shows simulation results. The horizontal axis indicates a lapse of time, and the vertical axis indicates a maximum value among the plurality of position measurement devices 20, which is an actual error between an estimated position and an actual position. The results from the pattern where positional correction is performed only with a beacon signal are indicated with a fine dotted line, and the results from the pattern where positional correction is performed with other device information is indicated with a solid line.

In this simulation, when positional correction is performed only with a beacon signal, the time average of the maximum errors is 8.6 m, and when positional correction is performed with other device information, the time average of the maximum errors is 5.3 m. In this manner, when the position measurement device 20 performs positional correction with other device information, the positioning error can be reduced by approximately 38% on average. Further, when positional correction is performed only with a beacon signal, the maximum value of the maximum errors is 16.3 m, and when positional correction is performed with other device information, the maximum value of the maximum errors is 7.6 m. When the position measurement device 20 performs positional correction with other device information, the maximum value of the maximum errors can be reduced by approximately 53%.

As described above, in the second example embodiment of the present invention, the position measurement device 20 receives, from the second device, the other device information including the second position of the second device and the second error of the second position that are estimated by the second device. Further, when the second error is smaller than the first error, the first position and the first error are corrected based on the other device information. With this, the position measurement device 20 is capable of correcting the position of the own device, based on the positioning result of the other device with a smaller error. Thus, positioning accuracy can be improved in an area that is not reached by a GNSS signal.

[Hardware Configuration Example]

Description is made on a configuration example of a hardware resource that achieves the position measurement device (10, 20) according to each of the example embodiments of the present invention described above by using one information processing device (computer). Note that, the position measurement device may be achieved by using at least two information processing devices physically and functionally. Further, the position measurement device may be achieved as a dedicated device. Further, only a partial function of the position measurement device may be achieved by using an information processing device.

FIG. 11 schematically shows a hardware configuration example of an information processing device that can achieve the position measurement device according to each of the example embodiments of the present invention. An information processing device 90 includes a communication interface 91, an input/output interface 92, an arithmetic unit 93, a storage unit 94, a nonvolatile storage unit 95, and a drive unit 96.

The communication interface 91 is a communication means with which the position measurement device according to each of the example embodiments communicates with an external device with a wire or/and wirelessly. Note that, when the position measurement device is achieved by using at least two information processing devices, these devices can be connected to be communicable with each other via the communication interface 91.

The input/output interface 92 is a man-machine interface such as a keyboard being one example of an input device and a display as an output device.

The arithmetic unit 93 is an arithmetic processing unit such as a generic central processing unit (CPU) and a microprocessor. For example, the arithmetic unit 93 can read various programs, which are stored in the nonvolatile storage unit 95, out in the storage unit 94, and can execute processing according to the read programs.

The storage unit 94 is a memory unit such as a random access memory (RAM) that can be referred to by the arithmetic unit 93, and stores programs, various types of data, and the like. The storage unit 94 may be a volatile memory unit.

For example, the nonvolatile storage unit 95 is a nonvolatile storage unit such as a read only memory (ROM) and a flash memory, and can store various programs, data, and the like.

For example, the drive unit 96 is a unit that executes processing of reading and writing data with respect to a recording medium 97 described later.

For example, the recording medium 97 is a freely-selected recording medium capable of recording data, such as an optical disk, a magneto-optical disk, and a semiconductor flash memory.

In each of the example embodiments of the present invention, for example, the position measurement device may be formed by the information processing device 90 illustrated in FIG. 11, and may be achieved by providing the position measurement device with a program capable of achieving the functions described in each of the example embodiments described above.

In this case, the program provided to the position measurement device is executed by the arithmetic unit 93, and thus the example embodiments can be achieved. Further, instead of all the functions of the position measurement device, a partial function may be formed by the information processing device 90.

Further, the above-described program may be stored in the recording medium 97, and the program may be stored in the nonvolatile storage unit 95 as appropriate at the stage of shipment, the stage of operation, or the like of the position measurement device. Note that, in this case, as a method of providing the program, there may be adopted a method of installing the program in the position measurement device through use of an appropriate jig at the stage of manufacturing before shipment, the stage of operation, or the like. Further, as the method of providing the program, there may be adopted a general procedure such as a method of downloading the program from outside via a communication line such as the Internet.

A part or the entirety of the example embodiments described above may be described as in the following supplementary notes, but is not limited to the followings.

(Supplementary Note 1)

A position measurement device, comprising:

a positioning means for estimating a first position of an own device;

an error estimation means for estimating a first error of the first position;

a reception means for receiving, from a second device, other device information including a second position of the second device and a second error of the second position that are estimated by the second device; and a correction means for correcting the first position and the first error, based on the other device information when the second error is smaller than the first error.

(Supplementary Note 2)

The position measurement device according to supplementary note 1, wherein the correction means corrects the first position to the second position.

(Supplementary Note 3)

The position measurement device according to supplementary note 1 or 2, wherein the other device information includes information relating to a transmission distance of the second device, the transmission distance being a distance from the second device, the distance capable of reception of the other device information, and, when a sum of the second error and the transmission distance of the second device is smaller than the first error, the correction means performs correction of the first position and the first error.

(Supplementary Note 4)

The position measurement device according to supplementary note 3, wherein the correction means corrects the first error to a sum of the second error and the transmission distance of the second device.

(Supplementary Note 5)

The position measurement device according to supplementary note 3 or 4, wherein, when the other device information is received from two or more of the second devices, the correction means corrects the first position to a center of a smallest enclosing circle and the first error to a radius of the smallest enclosing circle, the smallest enclosing circle having a smallest radius among circles each including a common region of circles having the second position as a center and a sum of the second error and the transmission distance as a radius, based on each piece of the other device information.

(Supplementary Note 6)

The position measurement device according to any one of supplementary notes 1 to 5, wherein the error estimation means estimates the first error, based on an estimated travel amount of the own device or a lapse of time after the first position and the first error are reset.

(Supplementary Note 7)

The position measurement device according to supplementary note 6, wherein the error estimation means estimates the first error, based on a difference between the first positions before and after the reset.

(Supplementary Note 8)

The position measurement device according to any one of supplementary notes 1 to 7, further comprising:

a transmission means for transmitting own device information including the first position and the first error.

(Supplementary Note 9)

The position measurement device according to supplementary note 8, wherein the transmission means transmits the own device information with transmission power that causes a range capable of receiving the own device information to fall within a predetermined transmission range, and the own device information includes information relating to the transmission range of the own device.

(Supplementary Note 10)

The position measurement device according to supplementary note 8 or 9, wherein, when the first error exceeds a predetermined value, the transmission means stops transmission of the own device information.

(Supplementary Note 11)

A position measurement method, comprising:

estimating a first position of an own device;

estimating a first error of the first position;

receiving, from a second device, other device information including a second position of the second device and a second error of the second position that are estimated by the second device; and correcting the first position and the first error, based on the other device information when the second error is smaller than the first error.

(Supplementary Note 12)

The position measurement method according to supplementary note 11, further comprising correcting the first position to the second position.

(Supplementary Note 13)

The position measurement method according to supplementary note 11 or 12, wherein the other device information includes information relating to a transmission distance of the second device, the transmission distance being a distance from the second device, the distance capable of reception of the other device information, and, when a sum of the second error and the transmission distance of the second device is smaller than the first error, the first position and the first error are corrected.

(Supplementary Note 14)

The position measurement method according to supplementary note 13, further comprising correcting the first error to a sum of the second error and the transmission distance of the second device.

(Supplementary Note 15)

The position measurement method according to supplementary note 13 or 14, further comprising, when the other device information is received from two or more of the second devices, correcting the first position corrected to a center of a smallest enclosing circle, and correcting the first error to a radius of the smallest enclosing circle, the smallest enclosing circle having a smallest radius among circles each including a common region of circles having the second position as a center and a sum of the second error and the transmission distance as a radius, based on each piece of the other device information.

(Supplementary Note 16)

The position measurement method according to any one of supplementary notes 11 to 15, further comprising estimating the first error, based on an estimated travel amount of the own device or a lapse of time after the first position and the first error are reset.

(Supplementary Note 17)

The position measurement method according to supplementary note 16, further comprising estimating the first error, based on a difference between the first positions before and after the reset.

(Supplementary Note 18)

The position measurement method according to any one of supplementary notes 11 to 17, further comprising:

transmitting own device information including the first position and the first error.

(Supplementary Note 19)

The position measurement method according to supplementary note 18, further comprising transmitting the own device information with transmission power that causes a range capable of receiving the own device information to fall within a predetermined transmission range, wherein the own device information includes information relating to the transmission range of the own device.

(Supplementary Note 20)

The position measurement method according to supplementary note 18 or 19, further comprising, when the first error exceeds a predetermined value, stopping transmission of the own device information.

(Supplementary Note 21)

A computer-readable recording medium that records a position measurement program causing a computer to execute:

a positioning function of estimating a first position of an own device;

an error estimation function of estimating a first error of the first position;

a reception function of receiving, from a second device, other device information including a second position of the second device and a second error of the second position that are estimated by the second device; and a correction function of correcting the first position and the first error, based on the other device information when the second error is smaller than the first error.

(Supplementary Note 22)

The computer-readable recording medium that records the position measurement program according to supplementary note 21, wherein the correction function corrects the first position to the second position.

(Supplementary Note 23)

The computer-readable recording medium that records the position measurement program according to supplementary note 21 or 22, wherein the other device information includes information relating to a transmission distance of the second device, the transmission distance being a distance from the second device, the distance capable of reception of the other device information, and, when a sum of the second error and the transmission distance of the second device is smaller than the first error, the correction function performs correction of the first position and the first error.

(Supplementary Note 24)

The computer-readable recording medium that records the position measurement program according to supplementary note 23, wherein the correction function corrects the first error to a sum of the second error and the transmission distance of the second device.

(Supplementary Note 25)

The computer-readable recording medium that records the position measurement program according to supplementary note 23 or 24, wherein, when the other device information is received from two or more of the second devices, the correction function corrects the first position to a center of a smallest enclosing circle and the first error to a radius of the smallest enclosing circle, the smallest enclosing circle having a smallest radius among circles each including a common region of circles having the second position as a center and a sum of the second error and the transmission distance as a radius, based on each piece of the other device information.

(Supplementary Note 26)

The computer-readable recording medium that records the position measurement program according to any one of supplementary notes 21 to 25, wherein the error estimation function estimates the first error, based on an estimated travel amount of the own device or a lapse of time after the first position and the first error are reset.

(Supplementary Note 27)

The computer-readable recording medium that records the position measurement program according to supplementary note 26, wherein the error estimation function estimates the first error, based on a difference between the first positions before and after the reset.

(Supplementary Note 28)

The computer-readable recording medium that records the position measurement program according to any one of supplementary notes 21 to 27, further causing a computer to achieve:

a transmission function of transmitting own device information including the first position and the first error.

(Supplementary Note 29)

The computer-readable recording medium that records the position measurement program according to supplementary note 28, wherein the transmission function transmits the own device information with transmission power that causes a range capable of receiving the own device information to fall within a predetermined transmission range, and the own device information includes information relating to the transmission range of the own device.

(Supplementary Note 30)

The computer-readable recording medium that records the position measurement program according to supplementary note 28 or 29, wherein, when the first error exceeds a predetermined value, the transmission function stops transmission of the own device information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-248193, filed on Dec. 25, 2017, the disclosure of which is incorporated herein in its entirety by reference.

REFERENCE SIGNS LIST

10, 20 Position measurement device
11 Positioning unit
12 Error estimation unit
13 Reception unit
14 Correction unit
25 Transmission unit
90 Information processing device
91 Communication interface
92 Input/output interface
93 Arithmetic unit
94 Storage unit
95 Nonvolatile storage unit
96 Drive unit
97 Recording medium

The invention claimed is:

1. A position measurement device, comprising one or more memories storing instructions and one or more processors configured to execute the instructions to:

estimate a first position of an own device, the first position estimated based on a travelling direction and a travelling distance of the own device, the travelling direction and the travelling distance of the own device calculated based on information acquired from a sensor mounted on the own device;

estimate a first error of the first position based on an estimated travel amount of the own device or a lapse of time;

receive, from a second device, other device information including a second position of the second device and a second error of the second position that are estimated by the second device; and correct the first position and the first error, based on the other device information, when the second error is smaller than the first error, wherein the second position is estimated based on a travelling direction and a travelling distance of the second device, the travelling direction and the travelling distance of the second device calculated based on information acquired from a sensor mounted on the second device, and the second error is estimated based on an estimated travel amount of the second device or a lapse of time.

2. The position measurement device according to claim 1, wherein
the one or more processors configured to execute the instructions to correct the first position to the second position.

3. The position measurement device according to claim 1, wherein
the other device information includes information relating to a transmission distance of the second device, the transmission distance being a distance from the second device, the distance being a distance at which the other device information can be received, and,
when a sum of the second error and the transmission distance of the second device is smaller than the first error, the one or more processors configured to execute the instructions to perform correction of the first position and the first error.

4. The position measurement device according to claim 3, wherein
the one or more processors configured to execute the instructions to correct the first error to the sum of the second error and the transmission distance of the second device.

5. The position measurement device according to claim 3, wherein,
when the other device information is received from two or more of the second devices, the one or more processors configured to execute the instructions to correct the first position to a center of a smallest enclosing circle and the first error to a radius of the smallest enclosing circle, the smallest enclosing circle having a smallest radius among circles each including a common region of circles having the second position as a center and a sum of the second error and the transmission distance as a radius, based on each piece of the other device information.

6. The position measurement device according to claim 1, wherein
the first error is estimated, based on the estimated travel amount of the own device or the lapse of time after the first position and the first error are reset previously.

7. The position measurement device according to claim 6, wherein
the one or more processors configured to execute the instructions to estimate the first error, based on a difference between the first positions before and after the reset.

8. The position measurement device according to claim 1, wherein:
the one or more processors configured to execute the instructions to transmit own device information including the first position and the first error.

9. The position measurement device according to claim 8, wherein
the one or more processors configured to execute the instructions to transmit the own device information with transmission power that causes a range capable of receiving the own device information to fall within a predetermined transmission range, and
the own device information includes information relating to the transmission range of the own device.

10. The position measurement device according to claim 8, wherein,
when the first error exceeds a predetermined value, the one or more processors configured to execute the instructions to stop transmission of the own device information.

11. A position measurement method, comprising:
estimating a first position of an own device, the first position estimated based on a travelling direction and a travelling distance of the own device, the travelling direction and the travelling distance of the own device calculated based on information acquired from a sensor mounted on the own device;
estimating a first error of the first position based on an estimated travel amount of the own device or a lapse of time;
receiving, from a second device, other device information including a second position of the second device and a second error of the second position that are estimated by the second device; and
correcting the first position and the first error, based on the other device information, when the second error is smaller than the first error, wherein
the second position is estimated based on a travelling direction and a travelling distance of the second device, the travelling direction and the travelling distance of the second device calculated based on information acquired from a sensor mounted on the second device, and
the second error is estimated based on an estimated travel amount of the second device or a lapse of time.

12. The position measurement method according to claim 11, further comprising
correcting the first position to the second position.

13. The position measurement method according to claim 11, wherein
the other device information includes information relating to a transmission distance of the second device, the transmission distance being a distance from the second device, the distance being a distance at which of the other device information can be received, and,
when a sum of the second error and the transmission distance of the second device is smaller than the first error, the first position and the first error are corrected.

14. The position measurement method according to claim 13, further comprising
correcting the first error to the sum of the second error and the transmission distance of the second device.

15. The position measurement method according to claim 13, further comprising,
when the other device information is received from two or more of the second devices, correcting the first position to a center of a smallest enclosing circle, and correcting the first error to a radius of the smallest enclosing circle, the smallest enclosing circle having a smallest radius among circles each including a common region of circles having the second position as a center and a sum of the second error and the transmission distance as a radius, based on each piece of the other device information.

16. The position measurement method according to claim 11, wherein
the first error is estimated, based on the estimated travel amount of the own device or the lapse of time after the first position and the first error are reset previously.

17. The position measurement method according to claim 16, further comprising
estimating the first error, based on a difference between the first positions before and after the reset.

18. The position measurement method according to claim 11, further comprising
transmitting own device information including the first position and the first error.

19. The position measurement method according to claim 18, further comprising transmitting the own device information with transmission power that causes a range capable of receiving the own device information to fall within a predetermined transmission range, wherein the own device information includes information relating to the transmission range of the own device.

20. A non-transitory computer-readable recording medium that records a position measurement program causing a computer to execute:

a positioning function of estimating a first position of an own device, the first position estimated based on a travelling direction and a travelling distance of the own device, the travelling direction and the travelling distance of the own device calculated based on information acquired from a sensor mounted on the own device;

an error estimation function of estimating a first error of the first position based on an estimated travel amount of the own device or a lapse of time;

a reception function of receiving, from a second device, other device information including a second position of the second device and a second error of the second position that are estimated by the second device; and a correction function of correcting the first position and the first error, based on the other device information, when the second error is smaller than the first error, wherein the second position is estimated based on a travelling direction and a travelling distance of the second device, the travelling direction and the travelling distance of the second device calculated based on information acquired from a sensor mounted on the second device, and the second error is estimated based on an estimated travel amount of the second device or a lapse of time.

* * * * *